(12) United States Patent
Ireton

(10) Patent No.: US 7,043,479 B2
(45) Date of Patent: May 9, 2006

(54) REMOTE-DIRECTED MANAGEMENT OF MEDIA CONTENT

(75) Inventor: Mark Ireton, Portland, OR (US)

(73) Assignee: SigmaTel, Inc., Austin, TX (US)

( * ) Notice: Subject to any disclaimer, the term of this patent is extended or adjusted under 35 U.S.C. 154(b) by 143 days.

(21) Appl. No.: 09/992,091

(22) Filed: Nov. 16, 2001

(65) Prior Publication Data

US 2003/0097379 A1    May 22, 2003

(51) Int. Cl.
*G06F 17/30* (2006.01)

(52) U.S. Cl. .............................. 707/10; 707/3
(58) Field of Classification Search ............ 707/3, 707/7, 10; 725/37, 87; 345/961, 700; 715/961, 715/700
See application file for complete search history.

(56) References Cited

U.S. PATENT DOCUMENTS

| | | | | |
|---|---|---|---|---|
| 5,752,244 A | * | 5/1998 | Rose et al. | 707/5 |
| 6,049,806 A | * | 4/2000 | Crecine | 707/200 |
| 6,097,389 A | * | 8/2000 | Morris et al. | 345/804 |
| 6,301,586 B1 | * | 10/2001 | Yang et al. | 707/104.1 |
| 6,446,069 B1 | * | 9/2002 | Yaung et al. | 707/9 |
| 6,760,721 B1 | * | 7/2004 | Chasen et al. | 707/3 |
| 2002/0180803 A1 | * | 12/2002 | Kaplan et al. | 345/810 |
| 2002/0194195 A1 | * | 12/2002 | Fenton et al. | 707/104.1 |
| 2003/0110503 A1 | * | 6/2003 | Perkes | 725/86 |
| 2004/0220926 A1 | * | 11/2004 | Lamkin et al | 707/3 |

OTHER PUBLICATIONS

Sato et al "Dynamic multimedia integration with the WWW", IEEE 1999, pp. 448-451.*
Nirkhe et al "Quality of Service support for networked media players", IEEE 1995, pp. 234-238.*

* cited by examiner

*Primary Examiner*—Uyen Le
(74) *Attorney, Agent, or Firm*—Toler, Larson & Abel, LLP

(57) ABSTRACT

A remote media player and methods for managing content. The media player includes storage to store content files. A user interface allows the user to make content selections. The content selections are used with a content database to manage the relationships between the selections and the content files. The player also includes a processor to perform organization tasks on the content files based upon the content selections.

8 Claims, 3 Drawing Sheets

REMOTE-DIRECTED MANAGEMENT OF MEDIA CONTENT

BACKGROUND

1. Field

This disclosure relates to media players, more particularly to media devices that access content from content sources.

2. Background

Media devices, such as digital music players, typically access their content from sources of content that typically have larger storage capacity. These content sources may include personal computers and media servers. Generally, a user connects a player to the content source. The content source typically has a software application allowing the user to select the content to be loaded onto the player. In the example of a music player, the content would be digital music files, such as MP3 (Moving Picture Experts Group, layer 3) files.

In order to allow the user to select content, this application knows all of the content available. As the user selects content, the application moves the content to the player. This application may also provide the user the ability to manage the content on the player, as the player is connected to the content source running the application. In general the content source may be able to access content on a remote database through a media subscription service or other means.

Management of the content, both on the content source and the player, generally involves tools to organize and classify the music files. Organization may take the form of sorting or grouping of the content files. One example of grouping the files is a play list. A play list may identify files that have a similar attribute, such as the artist, genre, or may be those selected by the user. Creation of a play list generally involves the user selecting each content file individually and then identifying that file as being part of the play list. The play list is then saved with some sort of identifying name, allowing the user to play those files by selecting that play list.

Once the user has selected the files desired and performed any organizational tasks, the files are transferred to the player. Some terminology would classify this transfer operation as a 'push' operation, where the content source pushes the content to the player. A problem with the push operation is that the user must connect the player to the content source to perform the transfer, and that the transfer is directed by the content source. It would be useful if the user had more control of the organization and the transfer from the player.

SUMMARY

A media player includes storage to store content files. A user interface allows the user to make content selections. The content selections are used with a content database to manage the relationships between the selections and the content files. The player also includes a processor to perform organization tasks on the content files based upon the content selections. The database allows the user to manipulate and manage content on the player alone and when the player is connected to a source of content.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
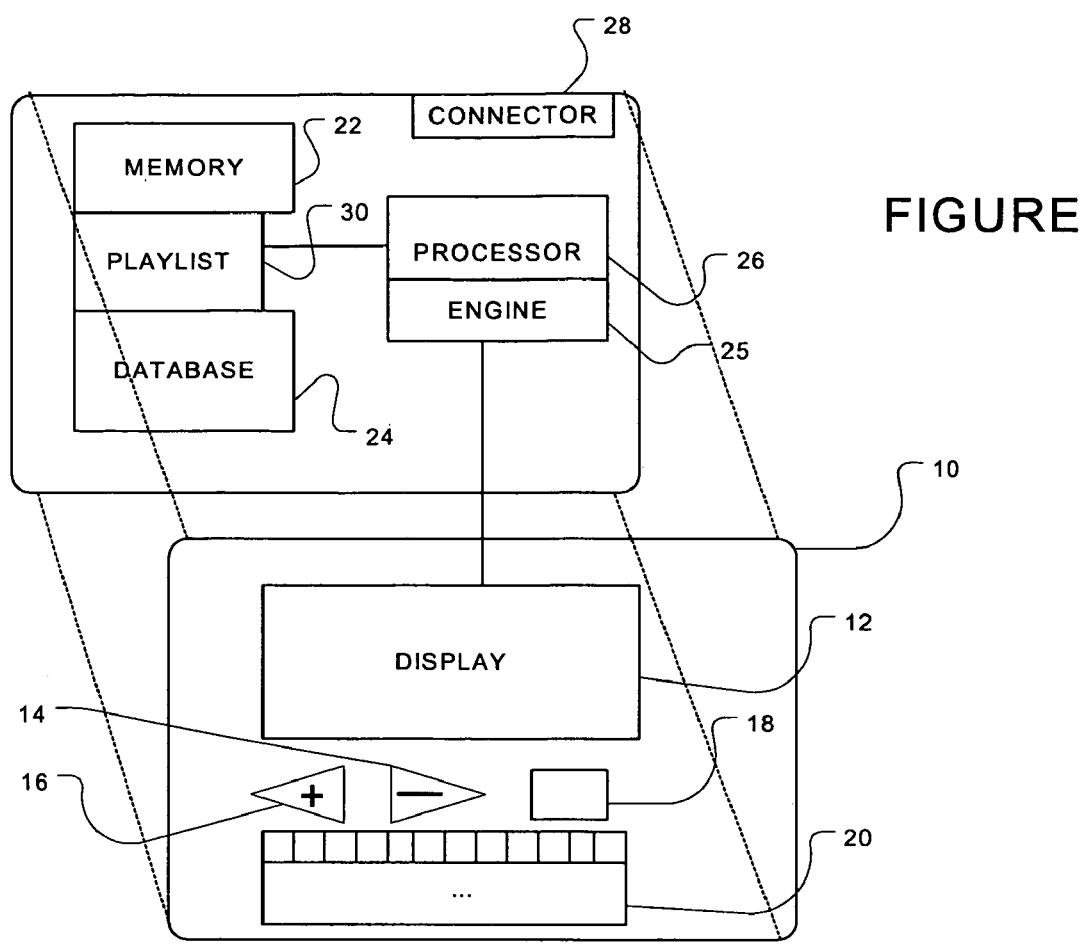
FIG. 1 shows an embodiment of a media player, in accordance with the invention.

FIG. 1 shows an embodiment of a media player. In this particular example the media player is a digital music player. However, it could be any type of media player, including a video player or other type of media device. The media player 10 has a front panel with a user interface. In the example of FIG. 1, the user interface includes a display 12, control buttons 14, 16 and 18, and possibly an alphanumeric keypad. The player may be portable, mounted in a vehicle or a boat, or it may be part of a home entertainment system, among other options. Generally, the player will not be a source of content, in that it will not typically be a media server with a storehouse of media content, nor will it be a network of media devices.

Within the player is a processor 26, which may have as part of it software that performs search and sorting tasks upon content stored in the player. This will be referred to as the search engine 25. A memory or storage 22 will store the content files. The content file store 22 may also contain the user content database 24 and the play list 30. Alternatively, both of these may be stored in separate storage. The content database tracks relationships between the content selection and the content files. For example, a file Music1 may have an identifier that indicates it is part of the content selection, or play list, named "Play List A."

The user content database allows the user to manipulate and manage the content on the player and when the player is connected to a source of content. As mentioned before, the player itself is not a source of content as defined above. The player accesses the source of content remotely, and as such may be referred to here as a remote media device. Current media players generally do not have any type of database or related capability installed on them, other than those files that are only accessible by the content source.

The user database does require some amount of memory capacity, but is relatively small when compared to the size of a typical media file. For example, a typical MP3 file consumes 1–3 Megabytes (MB) of space. A user content database, such as that shown at 24 in FIG. 1, will typically consume less than a few hundred Kilobytes (KB) of space depending on the number of tracks in the database and the amount of information stored for each entry. The media player can store this database easily without significantly affecting the available storage for the media content files.

Figure 2:
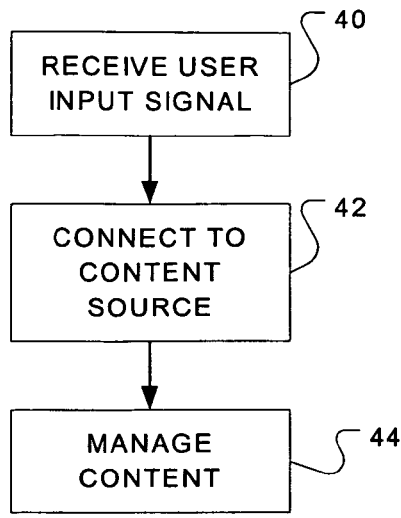
FIG. 2 shows a flowchart of an embodiment of a method to manage content on a media player.

This database allows the user to perform several different tasks with the content files. The user may create play lists, which are lists of files to be played grouped together under a list identifier, such as a name. These will be referred to as content selections. In addition, the user may transfer play lists created elsewhere to the media player, as well as store play lists already created on the media player. This is shown generally in FIG. 2.

At 40, the player receives a user input signal from the user interface on the player. This input may comprise one or more of several different choices the user can make. For example, the user may designate a play list already in existence on the player. The user may also designate how the play list is managed when the player is connected to a remote source.

These signals may be stored to be operated upon when the connection is made, or some preliminary processing may be done prior to the connection. At 42, the player is connected to the content source and the management tasks are performed at 44.

Figure 3:
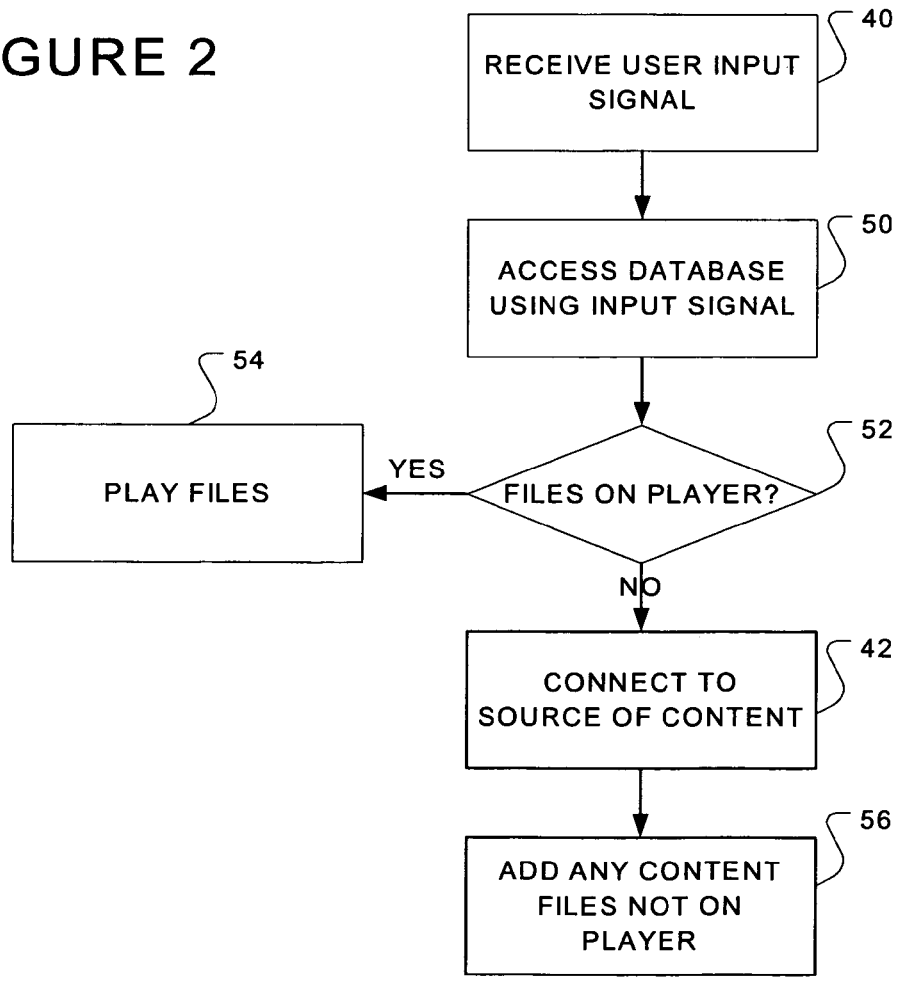
FIG. 3 shows a flowchart of an embodiment of a method to update content on a media player, in accordance with the invention.

Using the example above, where the user has selected a play list on the media player, the player would then identify those files listed in the play list not currently resident on the player. The player would then pull those files to the player storage when the player is connected to the source of content. This is shown in more detail in FIG. 3.

The player receives the input signal at 40, in this particular example, a play list identifier, such as a play list name. The player then accesses the database at 50 using the input signal to determine which files are associated with the play list. The player then determines at 52, typically from the database, which files are already on the player. If the files are already on the player, the player can play all files whenever the user selects that play list for playing at 54. Even if some files are not present, the play list may be played with the missing files omitted.

However, if the files are not on the player at 52, the player will identify a task that needs to be performed when the player is next connected to the source of content. When the player is next connected to the source of content at 42, the player will pull those files to it at 56. This pull operation may be modified or managed in many different ways, and will be discussed further. This is only one embodiment, as play lists may be played, with missing files omitted, without triggering a subsequent download to obtain the missing files. Similarly the play list may be used to define content to be downloaded without causing any of the content to be played. In general the user may use entirely different play lists for controlling the transfer of media and the reproduction of media.

The user can create the play list in several different methods. For example, the user could individually add tracks one at a time to a particular play list. Alternatively, the user could use the sort/search engine to manipulate the media content files in the content database. The database request may be all of the tracks of an album for music files, or maybe all of the video clips of a sports team for a video player. Other search terms could be the year of creation, the performer, a date range, etc. The player will satisfy all of the requests possible, as well as identifying those files that need to be added or updated.

Updating the media player involves adding files, as was discussed above, but also includes other tasks to synchronize between the play list on the media player and the content on the media player, as well as the content on the source. An example of synchronization could be to delete files from the player that are not associated with a play list, or have been deleted from a play list. Generally, this would not typically involve the source of content, unless the user desires to transfer those files back to the source rather than just deleting them completely. This may be necessary under certain security rules designed for protection of content, where only one copy of a particular file is allowed.

For example, when the source of content transferred the file to the player, it may have been required to delete the file from the source. If the user no longer wishes to have the file on the player, but may desire access to it some time in the future, the user needs to transfer it back to the player. When the file is then deleted off of the player, a copy still resides on the source.

The user may also set up rules for management of the space on the player. The user will want the most recently desired files on the player, rather than files that are either outdated or in which the user has lost interest. For example, rules for content that exists on the player may be: delete all, delete none, delete content that has not been played in the last X amount of time, delete content that has not been played, delete content that has already been played, etc. For example, the user may desire to 'clear' the player every time the user connects the remote device, allowing the user to start fresh and not have to track what files are already there and what files need to be added.

When the user specifies a play list that has missing files, the rules may execute to fill the list or may actually prevent the play list from being filled. For example, the user may select a rule that transfers all of the content from play list 1, then the content from play list 3 and then the content from play list 2. If the transfers for play lists 1 and 3 consume most of the available storage on the device, the files for play list 2 may not all be transferred. This will be referred to as transferring files sequentially.

Alternatively, the user could designate to have as many tracks as possible for each play list transferred, transferring 'across' the play lists. This may take the form of transferring the first specified track for play list 1, the first track for play list 2, the first track for play list 3, then the second track for play list 1, the second track for play list 2, etc.

Modifiers may also be added to the play lists to control how they pull content from the server. These modifiers may take the form of a field in the database, or a modification in the name of the play list that is parsed by the processor. Examples include sequential, random, least recently heard, etc.

Generally, the user content database on the player will contain more media than is available on the content source. In this case, the source of content will make efforts to provide the requested content. When the content is not available, the request will be dropped and the next one will be attempted. Transfer and update of the media on the player will continue until either the transfers and updates are complete, or the player storage becomes full. The user content database on the media player will be updated to reflect the status of the various files on the player.

Figure 4:
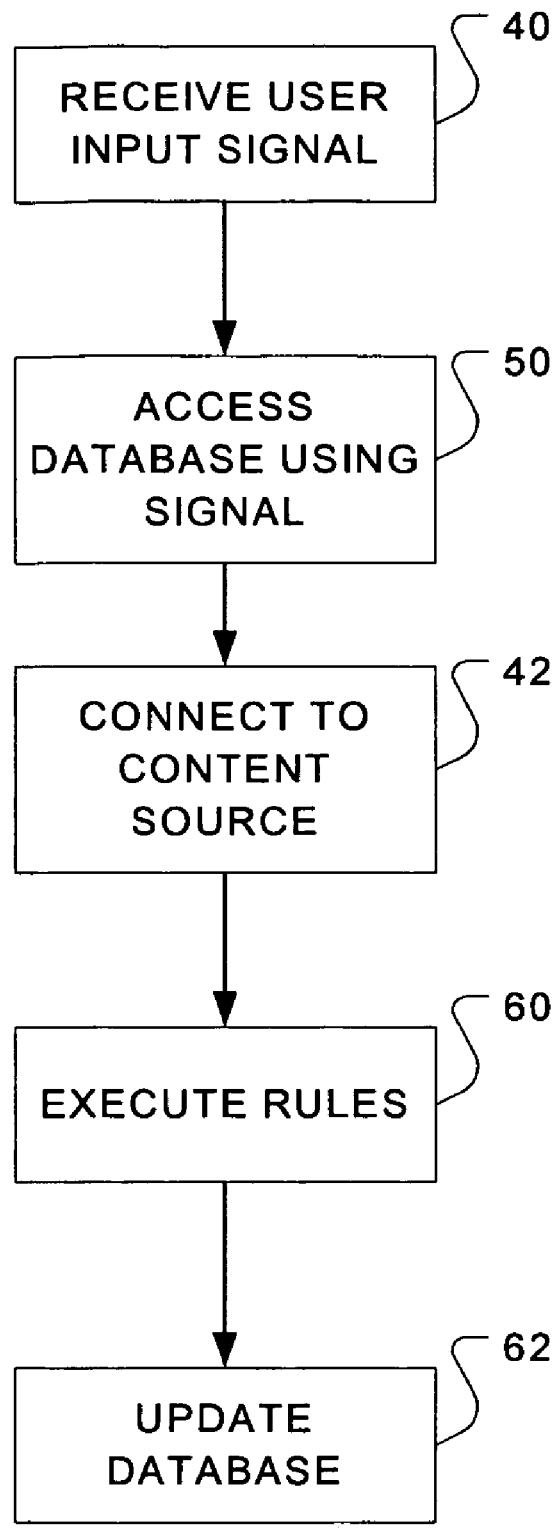
FIG. 4 shows a flowchart of an embodiment of a method to add content on a media player, in accordance with the invention.

This updating process, which may or may not include the more specific process of adding files, is shown in FIG. 4. Similar to those processes shown in FIGS. 2 and 3, the player receives a user input signal at 40. The player than accesses the database on the player at 50. This may or may not include identifying files that are not resident on the player. For example, the only task the user may perform is the deletion of files. The user connects the player to the source at 42. At 60, the player executes the predefined and selected rules to update the content on the media player. Finally, the database is updated at 62. It must be noted that the player controls these processes, not the source of content. For that reason, this process will be referred to as remote-directed management, to more clearly define that the media player, remote from the source, is the controller.

The processes of the invention, including those examples above, may be implemented as software code that can be downloaded or otherwise installed on the player. The software may be made available to current owners of players as an upgrade or included in the player as a software file. In any case, the software code will be contained in some article of computer-readable media. The software code, when executed by the player, will perform the methods of the invention as set out above.

Thus, although there has been described to this point a particular embodiment for a method and apparatus for remote-directed management of files on a media player, it is not intended that such specific references be considered as limitations upon the scope of this invention except in-so-far as set forth in the following claims.

What is claimed is:

1. A method of updating content on a media player, the method comprising:
   receiving a user input signal at the media player to identity a selection of content files;
   accessing a database within the media player, wherein the database provides a list of content files that includes identifiers of files not existing on the media player, the selection of content files being associated with content files in the list;
   connecting the media player to a source of content; and
   executing at least one predefined rule to perform at least one operation on at least one content file associated with the selection of content files.

2. The method of claim 1, wherein the source of content files is media server.

3. The method claim 1, wherein the source of content files is a network.

4. The method of claim 1, wherein the operation further comprises adding at least one content file to the media player.

5. The method of claim 1, wherein the operation further comprises deleting at least one content file from the media player.

6. The method of claim 5, wherein the operation further comprises transferring the content file to the source of content prior to deleting the content file from the player.

7. The method of claim 5, wherein the rule farther comprises transferring content to fill play lists sequentially.

8. The method of claim 5, wherein the rule further comprises transferring content across play lists.

* * * * *